United States Patent [19]

White

[11] 4,141,152
[45] Feb. 27, 1979

[54] PILOTING INSTRUMENT

[76] Inventor: W. Gordon White, 8 Sterling Dr., Dover, Mass. 02030

[21] Appl. No.: 855,919

[22] Filed: Nov. 30, 1977

[51] Int. Cl.$^2$ .......................................... G01C 17/02
[52] U.S. Cl. ...................................... 33/355 R; 33/262
[58] Field of Search ................. 33/355, 356, 357, 358, 33/359, 360, 361, 364, 262, 370

[56] References Cited

U.S. PATENT DOCUMENTS

| | | | |
|---|---|---|---|
| 1,409,808 | 3/1922 | Wood | 33/355 |
| 1,961,066 | 5/1934 | Mix | 33/355 |
| 2,634,702 | 4/1953 | Rowe | 33/364 |
| 2,796,666 | 6/1957 | Liebowitz | 33/262 |
| 3,029,517 | 4/1962 | Frey | 33/262 |
| 3,210,859 | 10/1965 | Fisk | 33/355 |
| 3,475,957 | 11/1969 | Hiszpanski | 73/180 |
| 3,670,417 | 6/1972 | Rogers | 33/262 |
| 3,812,593 | 5/1974 | Wydro | 33/373 |
| 3,826,502 | 7/1974 | Sorge | 33/262 |
| 3,843,262 | 10/1974 | Lazarer et al. | 356/153 |

FOREIGN PATENT DOCUMENTS 782576  6/1935  France ......................................... 33/355

Primary Examiner—Richard E. Aegerter
Assistant Examiner—John W. Shepperd
Attorney, Agent, or Firm—Kenway & Jenney

[57] ABSTRACT

A small, light magnetic compass, in which the magnetic moment of the compass card is large relative to its weight, is adjustably mounted upon a member firmly coupled to the human head so that accurate compass bearings may be obtained, or a vessel steered, through an optical system presenting a magnified image of the compass card to the eye of the wearer.

3 Claims, 11 Drawing Figures

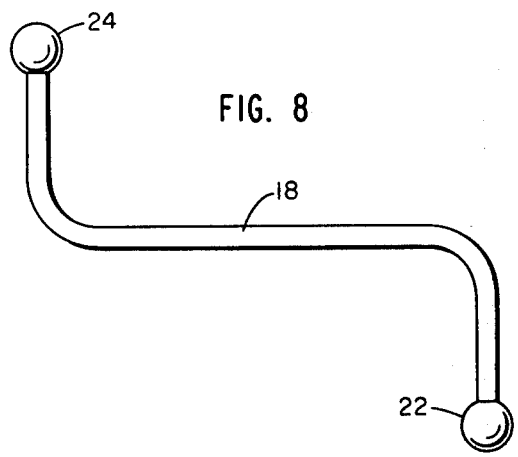
FIG. 8
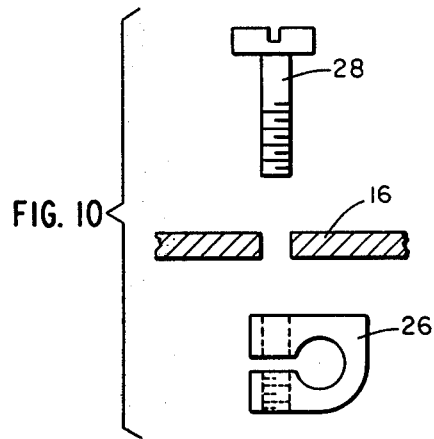
FIG. 10
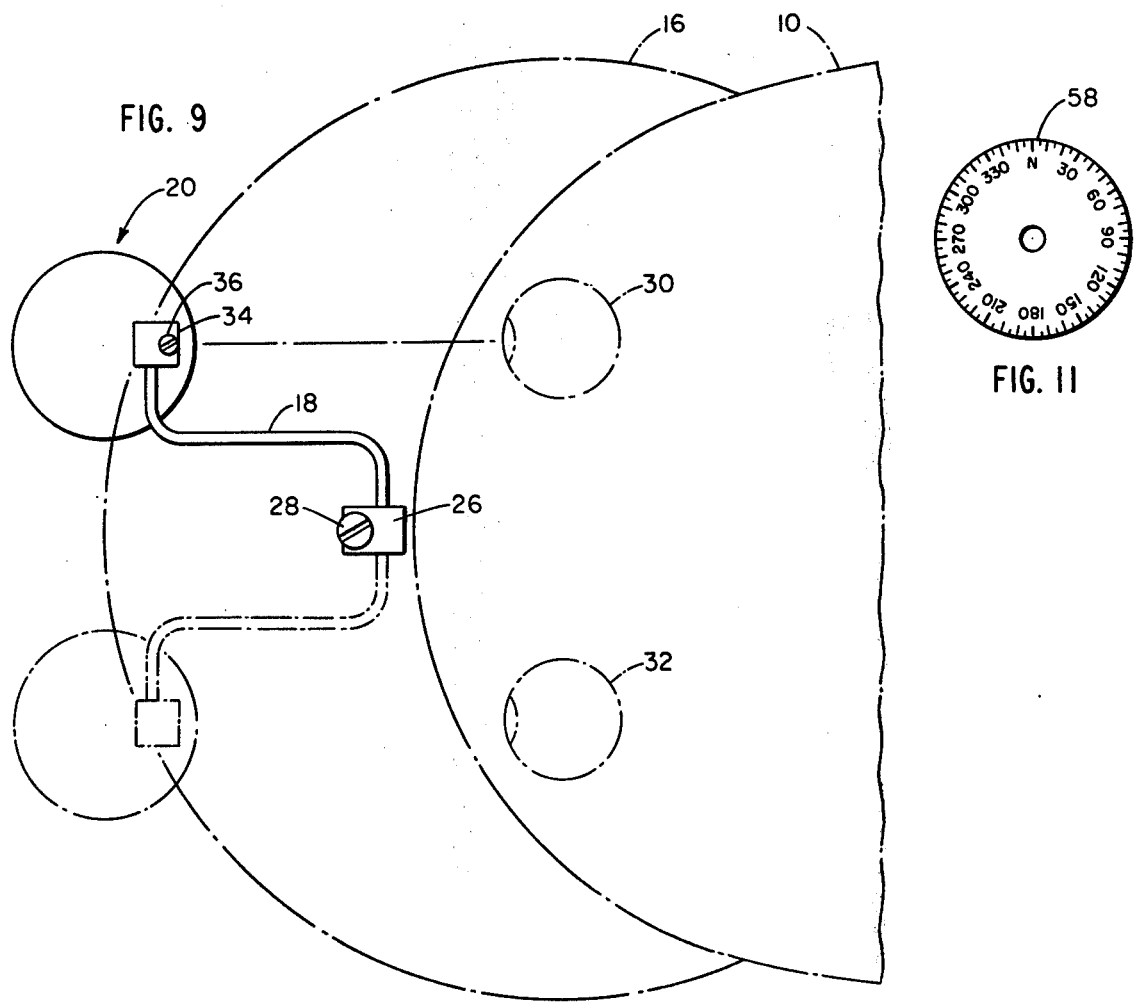
FIG. 9
FIG. 11

PILOTING INSTRUMENT

BACKGROUND OF THE INVENTION

Accurate piloting of a vessel involves relatively constant effort to ascertain the position of the vessel with respect to objects visible to the navigator. One method of ascertaining the position of a vessel is to take bearings of various objects such as buoys, lighthouses, headlands and the like. Such bearings establish lines of position, and by plotting two or more bearings a fix can be secured. On larger vessels it is customary to employ a pelorus suitably mounted on a bridge wing. Ordinarily the steering compass is not located in a position making it easily available for the taking of bearings. There are on the market hand-bearing compasses adapted to be held in the hand of the navigator so that he can take bearings by pointing the compass toward an object and reading its bearing. However, hand-bearing compasses are extremely difficult to operate when the vessel is pitching or rolling in response to wave motion. The hand is a relatively unsteady platform, the result being that a hand-bearing compass is subject to a plurality of dynamic disturbances and is therefore generally incapable of indicating magnetic direction with reliability. Such a compass wanders relative to the eye and to the object whose bearing is desired.

SUMMARY OF THE INVENTION

I have discovered that if a suitably light, magnetic compass is so mounted that it can be firmly coupled to the head, accurate bearings can be easily secured. The invention takes advantage of the natural functions of the human body, particularly the action of the inner ear canals which act to maintain equilibrium, acting in concert with other muscles and joints of the body. The invention is based upon my observation of people on vessels in rough seas. I noted that although a vessel may be subject to serve motions, the heads of those on board are evidently automatically maintained relatively level, stable and free from vibration.

In order to secure the desired results the compass must be designed for extremely quick damping, in view of the fact that the user can be expected to turn his head rather quickly from side to side. I have discovered that excellent results can be obtained if the weight of the compass card, and its magnet, is low relative to magnetic moment. Moreover, the card is immersed in a suitable liquid.

My invention is further characterized by an optical system including a lens and mirror built into the compass and so arranged that when the compass is in position, held securely to the head of the wearer, the user sees a reflected image of the lower surface of a portion of the compass card, magnified by the lens, while at the same time the user sees a distant object beneath the compass card. In other words, when the wearer is looking directly at the object, he sees its bearing on the compass.

One feature of the invention comprises a mounting system permitting the user to adjust the position of the compass so that it may be aligned with either eye.

BRIEF DESCRIPTION OF THE DRAWINGS

The various objects and features of the invention will be more readily apparent from the following detailed description of a preferred embodiment thereof selected for purposes of illustration and shown in the accompanying drawings in which:

FIG. 8 is a plan view of the bar used to mount the compass, FIG. 9 is a diagrammatic plan view of the compass mounted on the visor of a head band, FIG. 10 is an exploded view in side elevation of the clamp used to secure the mounting bar to the visor, and FIG. 11 is a plan view, actual size, of the compass card.

DESCRIPTION OF THE PREFERRED EMBODIMENT

Figure 1:
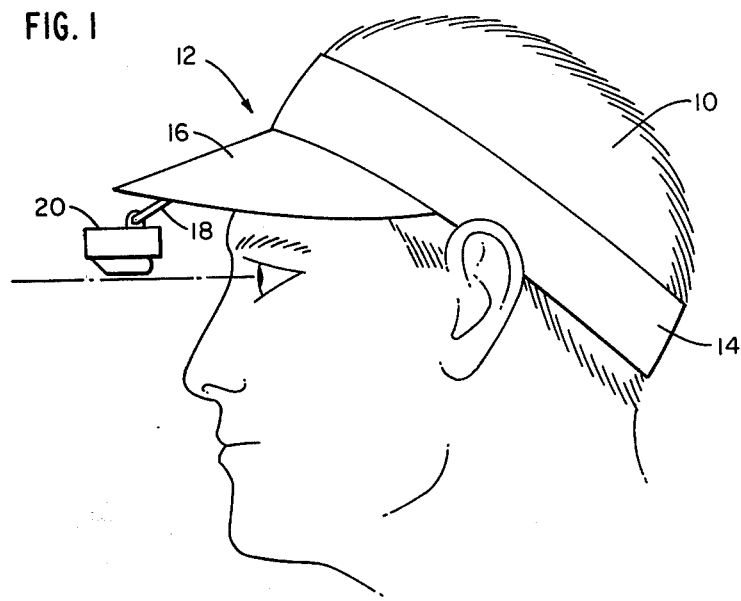
FIG. 1 is a view in side elevation of a compass constructed according to the invention and mounted upon the head of a user.
Figure 2:
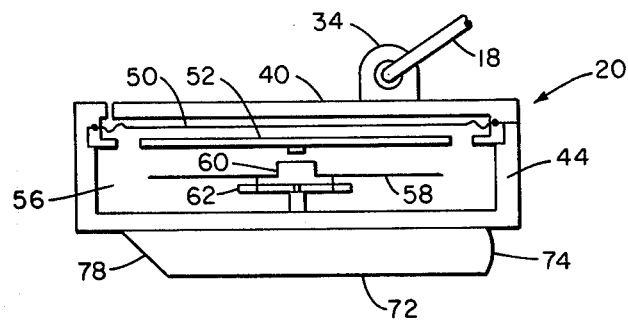
FIG. 2 is a view in side elevation, partly diagrammatic and on an enlarged scale, of a compass constructed in accordance with the invention.

As best shown in FIG. 1 the compass 20 of my invention is adapted to be secured to a cap, or head band 12 suitably dimensioned to fit snugly on the head 10 of a user. The cap 2 includes a band 14 encircling the head 10 as well as a stiff opaque visor 16. The compass 20 is mounted on the visor 16, as best shown in FIGS. 8-10, by means of a metal bar 18 having at its ends portions extending at right angles and in opposite directions. Each end portion terminates in a ball 22, 24. One end portion engages a clamp 26 secured to the visor 16 by a screw 28. One of the balls 22, 24 is placed in the socket of the clamp 26, and the screw 28 is operated to close the clamp about the ball and lock it firmly in place.

Figure 4:
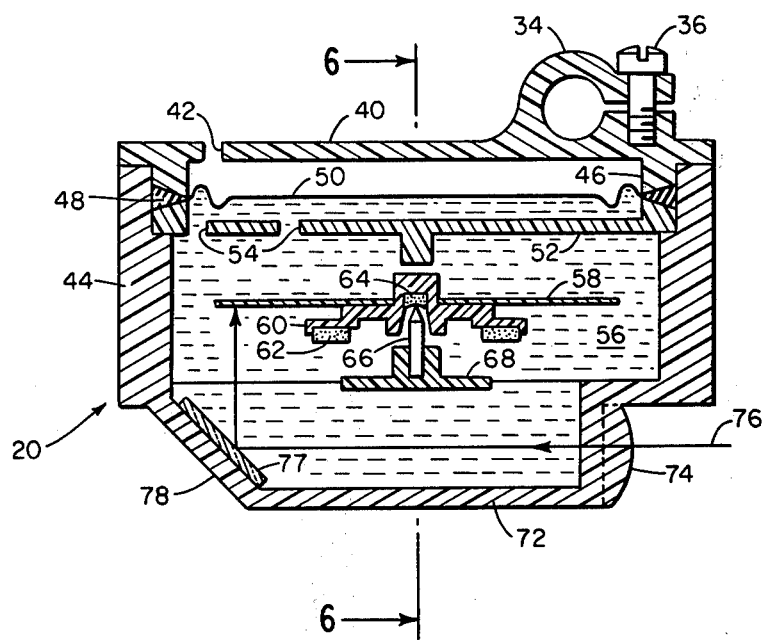
FIG. 4 is a view in cross-section through the compass.
Figure 5:
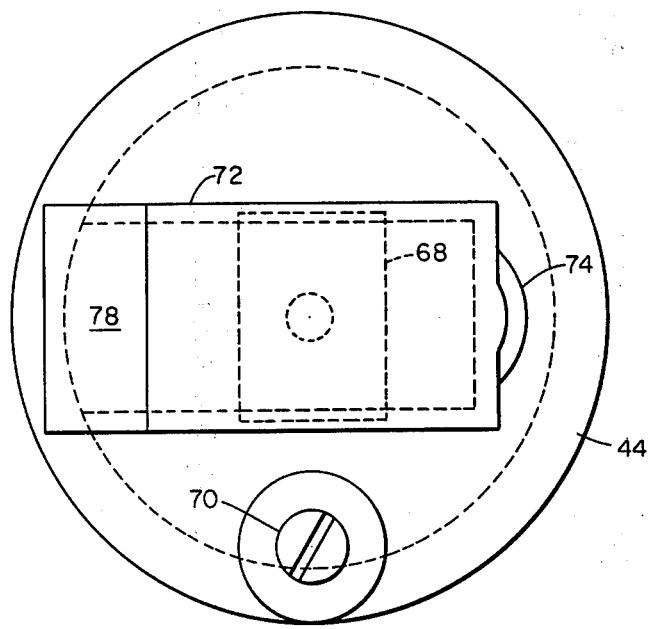
FIG. 5 is a bottom plan view of the compass.

As shown in FIG. 9 the bar 18 may be inverted, the result being that the compass 20 may be aligned with either the right eye 30 or the left eye 32 of the wearer. As shown in FIG. 4, the compass 20 is provided at its top with a similar clamp 34 controlled by a screw 36 and in which the other ball of the bar 18 is secured.

The compass 20 includes a transparent plastic circular cover plate 40 in which the clamp 34 is molded and which contains a small vent hole 42. The cover plate 40 has an integral depending annular flange 46 fitting snugly into the upper end of a transparent plastic cylindrical compass bowl 44. The bowl 44 and the cover plate 40 may conveniently be made of acrylic resin, although those skilled in the art will readily appreciate the availability of other suitable materials. I prefer to secure the cover plate 40 to the bowl 44 by ultrasonic welding.

Beneath the flange 46 there is mounted a sealing gasket 48 which rests upon an annular flange forming part of a flat circular plate 52. A thin rubber diaphragm 50 is held in position between the plates 40 and 52 by the engagement of its margin between the gasket 48 and the flange on the plate 52. The gasket 48 is preferably formed as an integral part of the diaphragm 50. The plate 52 also is provided with a pair of holes 54 forming fluid passages. A conventional compass liquid 56 fills the compass bowl 44, and the function of the diaphragm 50 is to accommodate changes in the volume of the liquid 56 as it responds to changes in ambient temperature.

Figure 6:
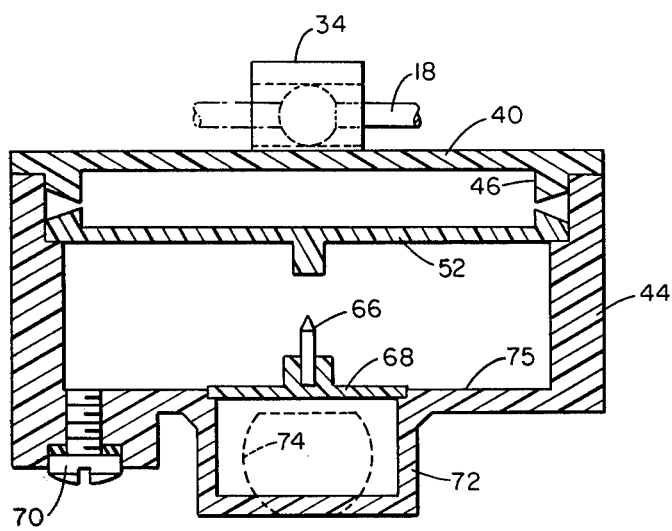
FIG. 6 is a view in cross-section with some parts removed taken along the line 6—6 of FIG. 4.
Figure 7:
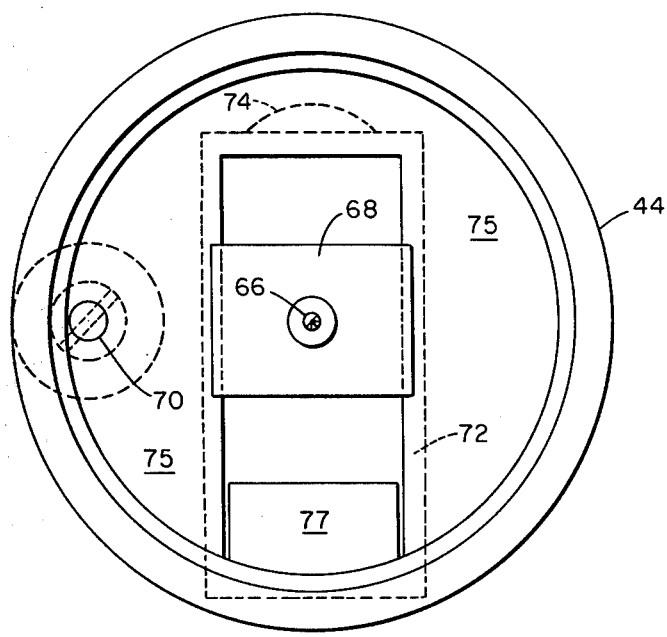
FIG. 7 is a top plan view of the compass bowl.

A transparent circular compass card 58 is disposed within the compass bowl 44 and is carried upon a plastic frame 60 secured to which is an annular light weight ceramic magnet 62 as well as a jewel 64 which rests upon a pivot 66. The magnet, jewel and pivot are of conventional form and materials. As best shown in FIG. 6 the pivot 66 is held in a socket formed in a base 68 mounted at the bottom of the bowl 44.

It is vitally important that the compass exhibit quick damping. To this end the compass card and its associated magnet exert very low weight on the pivot. In a preferred embodiment I have constructed, the weight on the pivot was 1.8 grams and the magnetic moment was 5 c.g.s. The half period of the card was 1.5 seconds. The magnet was an annulus of barium ferrite, a material with very low specific gravity. The weight of the entire compass was 1.2 ounces. The foregoing figures are close approximations and are not critical. However, they do illustrate the important principle that the magnetic moment of the card and magnet must be large in comparison with its weight or inertia.

In using such an instrument I have determined that when I turned my head 180° in two seconds, the compass settled in three seconds. Such extremely quick damping is essential for successful operation of the instrument.

The bottom of the compass bowl 44 is provided with an integrally molded, rectangular chamber 72 (see FIGS. 4-7) provided at one end with a magnifying lens 74 molded integrally or secured adhesively and at its other end with a sloping wall 78. A small, first-surface mirror 77 is adhesively secured to the inner surface of the wall 78 and is presented at an angle of approximately 45° to the optical axis of lens 74. Thus the line of sight 76 leads through the lens 74 to the mirror 77 and thence to the underside of a portion of the compass card 58.

Figure 3:
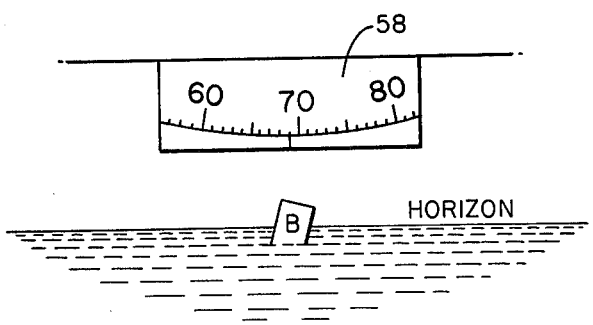
FIG. 3 is a view illustrating a portion of the compass card as seen by a user as well as showing a buoy in the water, as an example of how a bearing may be obtained.

Although the card 58 is quite small, as shown in FIG. 11, the viewer sees a greatly enlarged image, as shown in FIG. 3. There a buoy showing up on the horizon is juxtaposed with the image of a portion of the compass card 58. In this instance the bearing of the buoy from the vessel is 069° magnetic.

Although the compass of my invention is extremely useful in taking bearings, it may also be used for steering. The user merely looks straight ahead, over the bow of the vessel, and reads the ship's heading. The compass of my invention is particularly useful on small sail boats on which standard steering compasses are not usually supplied and which are also subject to more violent motions, as in high-speed motor boats, than are encountered in larger boats. Moreover, the instrument of my invention is useful to hikers, surveyors, and to pilots of aircraft, gliders, and high-speed vehicles.

Moreover, the visor 16 not only serves as a mount for the compass but also serves to shield both the compass and the eyes of the user from glare, thus contributing to the efficiency of the instrument.

The surprising improvement in accuracy manifested by the compass of my invention is primarily due to the synergistic effect of the physiological functions of the inner ear, the eyes, and the other bodily organs in concert with a light magnetic compass firmly coupled to the head of the user.

Those skilled in the art will readily understand that, without departing from the spirit of my invention various modifications will suggest themselves. For example, a tritium-excited "Beta lamp" could be incorporated in the compass in order to make it useful for nighttime piloting.

Having thus described and illustrated the preferred embodiment of my invention, what I claim as new and desire to secure by Letters Patent of the United States is:

1. A piloting instrument comprising a stiff visor, a liquid-filled magnetic compass, means for mounting said compass on said visor, comprising a clamp secured to said visor located substantially midway between the ends thereof, a clamp secured to said compass, each of said clamps having a bore extending inwardly from each side thereof, a bar having its end portions extending at angles and in different directions and terminating in balls, the ball on one end portion being secured to said clamp on said visor, the ball on the other end portion being secured to said clamp on said compass, said bar being capable of being inverted so that the balls on the end portions may be inserted in their respective clamps on either side of said bores so that the compass may be aligned with either the right or left eye, said liquid-filled magnetic compass including a compass card and a magnet secured to said card, the weight of the entire compass being about 1.2 ounces, the weight of the compass card and magnet in the liquid being about 1.8 grams and the half period of the compass card being about 1.5 seconds.

2. The piloting instrument of claim 1 in which a magnifying lens is mounted in position to present to the eye of the user an enlarged image of a portion of the compass card.

3. A piloting instrument comprising a stiff visor, a liquid-filled magnetic compass, means for mounting said compass on said visor, comprising a clamp secured to said visor located substantially midway between the ends thereof, a clamp secured to said compass, each of said clamps having a bore extending inwardly from each side thereof, a bar having its end portions extending at angles and in different directions and terminating in balls, the ball on one end portion being secured to said clamp on said visor, the ball on the other end portion being secured to said clamp on said compass, said bar being capable of being inverted so that the balls on the end portions may be inserted in their respective clamps on either side of said bores so that the compass may be aligned with either the right or left eye, said liquid-filled magnetic compass including a compass card and a magnet secured to said card, the weight of the card and magnet in the liquid and the half period and magnetic moment of the card and magnet being such that when the compass is rotated 180° in two seconds, the compass card comes to rest in three seconds.

* * * * *